(12) United States Patent
Nix et al.

(10) Patent No.: US 8,593,572 B2
(45) Date of Patent: Nov. 26, 2013

(54) VIDEO SIGNAL MOTION DETECTION

(75) Inventors: Uri Nix, Haifa (IL); Liron Ain-Kedem, Kiryat Tivon (IL)

(73) Assignee: CSR Technology Inc., Sunnyvale, CA (US)

(*) Notice: Subject to any disclaimer, the term of this patent is extended or adjusted under 35 U.S.C. 154(b) by 1158 days.

(21) Appl. No.: 12/247,915

(22) Filed: Oct. 8, 2008

(65) Prior Publication Data

US 2009/0190030 A1 Jul. 30, 2009

Related U.S. Application Data

(60) Provisional application No. 61/024,852, filed on Jan. 30, 2008.

(51) Int. Cl.
*H04N 11/20* (2006.01)

(52) U.S. Cl.
USPC .......... 348/452; 348/448; 348/699; 348/700; 348/701; 348/451; 345/204; 345/606

(58) Field of Classification Search
USPC .......... 348/452, 448, 700, 701, 12, 456, 699, 348/451; 345/204, 606
See application file for complete search history.

(56) References Cited

U.S. PATENT DOCUMENTS

| | | | |
|---|---|---|---|
| 3,716,670 A | 2/1973 | Lowry | |
| 4,845,557 A | 7/1989 | Lang | |
| 5,027,201 A | 6/1991 | Bernard | |
| 5,561,477 A * | 10/1996 | Polit | 348/700 |
| 5,617,135 A * | 4/1997 | Noda et al. | 348/14.12 |
| 6,262,773 B1 * | 7/2001 | Westerman | 348/448 |
| 6,348,949 B1 * | 2/2002 | McVeigh | 348/452 |
| 6,380,978 B1 * | 4/2002 | Adams et al. | 348/452 |
| 6,670,994 B2 * | 12/2003 | Voltz et al. | 348/448 |
| 7,075,581 B1 * | 7/2006 | Ozgen et al. | 348/448 |
| 7,202,907 B2 | 4/2007 | Chow | |
| 7,286,187 B2 * | 10/2007 | Ha et al. | 348/452 |
| 7,349,029 B1 * | 3/2008 | Chou | 348/448 |
| 7,405,770 B1 * | 7/2008 | Gudmunson | 348/607 |
| 7,701,508 B2 * | 4/2010 | Wang et al. | 348/452 |
| 8,004,606 B2 * | 8/2011 | Adams | 348/448 |
| 2002/0149703 A1 * | 10/2002 | Adams et al. | 348/700 |
| 2003/0086016 A1 * | 5/2003 | Voltz et al. | 348/459 |
| 2004/0070687 A1 * | 4/2004 | Voltz et al. | 348/448 |
| 2005/0140664 A1 * | 6/2005 | Kawamura et al. | 345/204 |
| 2005/0168651 A1 * | 8/2005 | Morino | 348/700 |
| 2005/0201626 A1 * | 9/2005 | Kang et al. | 382/236 |
| 2005/0237433 A1 * | 10/2005 | Van Dijk et al. | 348/702 |
| 2006/0181648 A1 * | 8/2006 | Park et al. | 348/670 |
| 2007/0033632 A1 * | 2/2007 | Baynger et al. | 725/135 |
| 2007/0103570 A1 * | 5/2007 | Inada et al. | 348/252 |
| 2007/0206117 A1 * | 9/2007 | Tian et al. | 348/452 |
| 2007/0229534 A1 * | 10/2007 | Kim et al. | 345/606 |
| 2007/0286287 A1 * | 12/2007 | Kim et al. | 375/240.16 |
| 2007/0296858 A1 * | 12/2007 | Eymard et al. | 348/456 |
| 2008/0117968 A1 * | 5/2008 | Wang | 375/240.12 |
| 2008/0174786 A1 * | 7/2008 | Takizawa et al. | 356/521 |

* cited by examiner

*Primary Examiner* — Jefferey Harold
*Assistant Examiner* — Mustafizur Rahman
(74) *Attorney, Agent, or Firm* — Lando & Anastasi, LLP

(57) ABSTRACT

Systems and methods directed to determining motion in a video signal are provided. A plurality of pixels of a plurality of adjacent field lines of alternating parity of the video signal are evaluated to generate a plurality of differential values. A sign of each differential value is determined, and when each differential value has the same sign, at least one differential value can be compared with a threshold value. Responsive to the comparison of at least one differential value with a threshold value, a motion coefficient indicative of a magnitude of motion associated with one of the plurality of pixels can be generated.

35 Claims, 6 Drawing Sheets

VIDEO SIGNAL MOTION DETECTION

CROSS REFERENCE TO RELATED APPLICATIONS

This application claims priority under 35 U.S.C. 119(e) to U.S. Provisional Application Ser. No. 61/024,852 entitled "Method for Motion Detection in Interlaced Video," filed Jan. 30, 2008, which is incorporated herein by reference in its entirety.

BACKGROUND OF THE INVENTION

1. Field of the Invention

Aspects of the present invention are directed to processing of a video signal, and more particularly to a system and method for signal processing that determines motion in a digital video signal.

2. Background of the Invention

Video signals include a series of images, or frames, played in succession, and can include a series of frames each divided into two fields. One field contains odd lines of pixels in a frame, and the other field contains even lines of pixels in a frame. Dividing each frame into a set of odd fields and a set of even fields reduces the amount of bandwidth necessary to transmit a video signal. Historically, displaying a video signal with alternating odd and even fields reduced or eliminated levels of visible flicker in the displayed video signal.

Some video signals are not well suited for modern computer monitor or televisions, such as those with plasma, liquid crystal, or other displays that support high definition formats. For optimal performance these devices and others generally use a video signal where a frame includes all fields, odd and even, of a video signal. In certain video signals the odd and even fields are successively scanned, and as a result an object that is in motion may be in one position during scanning of one field, and may be in a different position during subsequent scanning of another field. Motion of objects that takes place in the time period between the odd and even field scans of a video signal results in visually perceptible and undesirable artifacts. These artifacts can be encoded into the video signal. Motion that is present between the odd an even fields of a frame manifests itself as an unwanted artifact that degrades the image of the video signal. These schemes are imperfect, as various distortions appear in a display of the video signal, reducing its quality on both standard and high definition displays.

SUMMARY OF THE INVENTION

The aspects and embodiments of the present invention are directed to systems and methods of determining motion in a video signal. To increase efficiency and enhance video quality, motion between fields of a frame can be detected on a pixel by pixel basis. Further, these aspects and embodiments are compatible with the video signals so that motion in a video signal can be identified and processed accordingly to, for example, remove artifacts from a display of a video signal. This improves the quality of video signals.

At least one aspect is directed to a method for determining motion in a video signal. The method evaluates a plurality of pixels of a plurality of adjacent field lines of alternating parity of the video signal to generate a plurality of differential values. The method also determines that each differential value is of a same sign, and compares at least one differential value with a threshold value. Responsive to the comparison of at least one differential value with a threshold value, the method generates a motion coefficient indicative of a magnitude of motion associated with one of the plurality of pixels.

In various embodiments, the video signal can include an interlaced video signal, the motion coefficient can be provided to a controller, and a progressive video signal corresponding to the interlaced video signal can be generated. Evaluating the plurality of pixels can include evaluating at least one pixel from each of two field lines of a first parity, and at least one pixel from each of three field lines of a second parity, where each of the three field lines is adjacent to at least one of the two field lines. A motion coefficient associated with a pixel from one of the two field lines can be generated. The plurality of adjacent field lines can include five field lines of alternating parity and evaluating a plurality of pixels can include evaluating a pixel from each of the five field lines. Pixels in the five field lines can be vertically aligned in a column, can be aligned so as to form a diagonal through the five field lines, or can be arranged in random or other configurations. Evaluating the pixels can include generating a first, second, and third differential value. Evaluating the pixels can also include generating a first and a second differential value, and generating the third differential value based at least in part on an evaluation of the first and second differential values. Based at least in part on the motion coefficient, the method can identify an edge of the image, and the method can identify an artifact in the image. The method can also detect an artifact associated with one of a plurality of pixels, and can remove the artifact from the video signal.

At least one other aspect is directed to a motion detector circuit. The motion detector circuit includes a motion detector unit configured to evaluate a plurality of pixels of a video signal that has a plurality of adjacent field lines of alternating parity. The motion detector unit is further configured to generate a plurality of differential values, and to determine that each differential value is of a same sign. The motion detector circuit includes at least one comparator configured to compare at least one differential value with at least one threshold value. The motion detector circuit can generate a motion coefficient indicative of a magnitude of motion associated with one of the plurality of pixels.

In various embodiments, the video signal can include an interlaced video signal, a control circuit can receive the motion coefficient, and a deinterlacer circuit can receive the interlaced video signal and can provide a progressive video signal based at least in part on an evaluation of the motion coefficient. The motion detector unit can evaluate at least one pixel from each of two lines of a first parity, and at least one pixel from each of three field lines of a second parity, wherein each of the three field lines is located adjacent to at least one of the two field lines. The motion coefficient can be associated with a pixel from one of the two field lines of the first parity. The adjacent field lines can include five field lines of alternating parity, and the motion detector unit can evaluate at least one pixel from each of the five field lines. The motion detector unit can generate first, second, and third differential values, and the comparator can compare at least one differential value with at least one threshold value. The third differential value can be based on an evaluation of the first and second differential values.

At least one other aspect is directed to a motion detector circuit. The motion detector circuit includes means for evaluating a plurality of pixels of a video signal having a plurality of adjacent field lines of alternating parity to generate a plurality of differential values. The motion detector circuit also includes means for determining that each differential value is of a same sign. The motion detector further includes a comparator configured to compare at least one differential value with at least one threshold value to generate a motion coefficient indicative of a magnitude of motion associated with one of the plurality of pixels.

Other aspects, embodiments, and advantages of these exemplary aspects and embodiments will become apparent from the following detailed description, taken in conjunction with the accompanying drawings, illustrating the principles of the invention by way of example only. It is to be understood that the foregoing information and the following detailed description include illustrative examples of various aspects and embodiments, and are intended to provide an overview or framework for understanding the nature and character of the claimed aspects and embodiments. The drawings, together with the remainder of the specification, serve to explain principles and operations of the described and claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. The foregoing and other objects, features, and advantages of the systems and methods disclosed herein, will be more fully understood from the following description of various embodiments, when read together with the accompanying drawings, in which.

DETAILED DESCRIPTION

Figure 1:
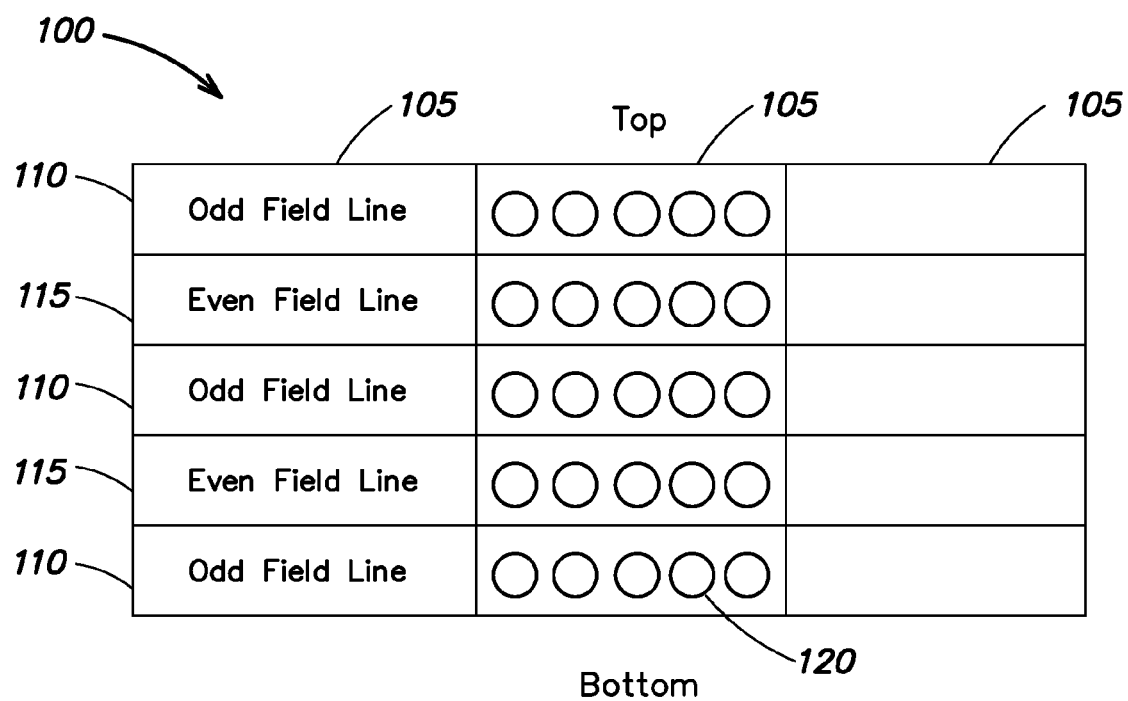
FIG. 1 is a diagram depicting a video signal in accordance with an embodiment of the invention.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

As shown in the drawings for the purposes of illustration, a motion detector circuit may determine a measure of motion associated with a pixel of a video signal. For example, the motion detector can evaluate pixels from a plurality of field lines of a video signal to generate a plurality of differential values. The differential values can be analyzed to determine if they are all of a same sign, and when, for example, the differential values all have a same sign, at least one of the differential values can be compared to at least one threshold value. Based at least in part on this comparison, the motion detector circuit can generate a motion coefficient indicative of a magnitude of motion of at least one of the pixels. This motion coefficient, (e.g., a number) can be used for further deinterlacing, edge detection, artifact removal, or other processing operations.

FIG. 1 is a diagram depicting a video signal 100 in accordance with an embodiment of the invention. In one embodiment, video signal 100 includes an interlaced video signal. In one embodiment, video signal 100 includes a progressive video signal. Video signal 100 may include a video signal having a series of frames 105, where each frame 105 includes a plurality of field lines grouped into two fields that can be sequentially scanned. For example, video signal 100 may include a field of a first parity, such as odd field 110, and a field of a second parity, such as even field 115. Generally, both odd field 110 and even field 115 include a plurality of field lines. The overall number of field lines may vary. In one embodiment, each odd field 110 and even field 115 may include half of the total amount of field lines of frame 105, although it is appreciated that the overall number of field lines of odd field 110 and even field 115 need not be equal. Each field line of frame 105 can include a plurality of pixels 120. In one embodiment, pixels 120 can be oriented in a row so that each field line includes a row of pixels 120. For example, a field line such as any field line included in odd field 110 or even field 115 may include a row of pixels 120 along the length of a field line, and may be one pixel wide. For the purpose of illustration, not every pixel 120 is shown in every field line in FIG. 1, and the number of pixels along the length and width of field lines can vary.

In one embodiment, frame 105 includes any number of field lines, alternating as shown in FIG. 1 from top to bottom of frame 105 between odd field lines of odd field 110 and even field lines of even field 115. In this illustrative embodiment, each field line of video signal 100 is adjacent to at least one other field line having a different parity. For example, every field line of odd field 110 may be adjacent to at least one field line of even field 115. As illustrated in FIG. 1, one row of pixels running horizontally across the bottom border of frame 105 may be a first row of a first parity, (e.g., an odd line of odd field 110). Another row of pixels of a second parity (e.g., an even line of even field line 110) may run horizontally across the frame adjacent to and, for example, above the first row. This sequence of a plurality of adjacent field lines of alternating parity, where each field line is adjacent to at least one other row, may continue across frame 105 of video signal 100.

The nomenclature of "even" and "odd" fields is not limiting and generally indicates the existence of field lines of different parity. Video signal 100 may include other fields and other field lines of different parities and in varying configurations. The use of "above," "below" and other relative indications of location are not intended to be limiting as it is understood that video signal 100 may have other spatial orientations.

Figure 2:
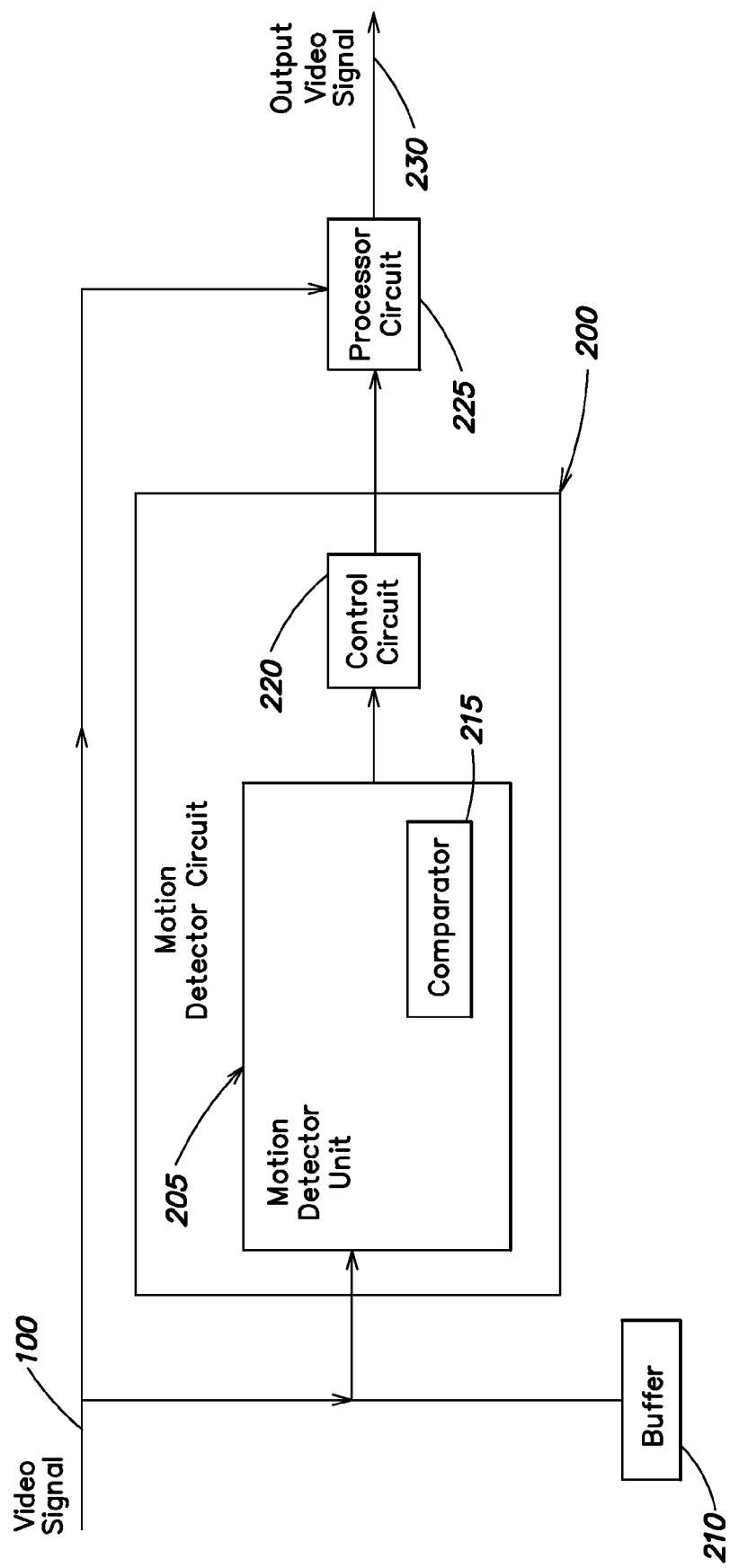
FIG. 2 is a block diagram depicting a motion detector circuit in accordance with an embodiment of the invention.

FIG. 2 is a block diagram depicting a motion detector circuit 200 in accordance with an embodiment of the invention. With reference to FIG. 1 and FIG. 2, motion detector circuit 200 can evaluate at least one video signal 100. For example, motion detector circuit 200 can receive video signal 100 for evaluation or processing by at least one motion detector unit 205. Motion detector unit 205 may include, for example, at least one logic device or circuit that detects motion associated with one or more pixels 120 of video signal 100. In various embodiments, motion detector unit 205 may include a 2:2 pull down field motion detector unit or a 3:2 pull down field motion detector unit. It should be appreciated that a 2:2 pull down field motion detector can detect a 2:2 field pattern in video signal 100 and that a 3:2 pull down field motion detector can detect a 3:2 field pattern in video signal 100 based at least in part on a comparison of consecutive fields of video signal 100.

Generally, motion detector unit 205 can identify motion, on a pixel by pixel basis, of any pixel 120 of video signal 100. In one exemplary embodiment, motion detector unit 205 evaluates a plurality of pixels 120 of video signal 100 to identify motion of any pixel 120. Generally, values or properties of one pixel 120 can be compared with values or properties of other pixels 120 of video signal 100. As described herein, references to motion detector 205 evaluating any pixel 120 can include motion detector 205 or motion detector circuit 200 evaluating any data, values, or coefficients that are associated with any pixel 120. It is appreciated that pixels 120 may include elements of a display, and that video signal 100 may include data corresponding to pixels 120, and that it can be the data associated with pixels 120 that is evaluated by motion detector circuit 200, its elements, and associated circuits. The results of the comparison can include differential values that indicate a magnitude, nature, or scope of the differences between pixel values. The comparison of pixel values can include a comparison of luminance, chrominance, hue, saturation, or other values of a plurality of pixels 120.

Figure 3:
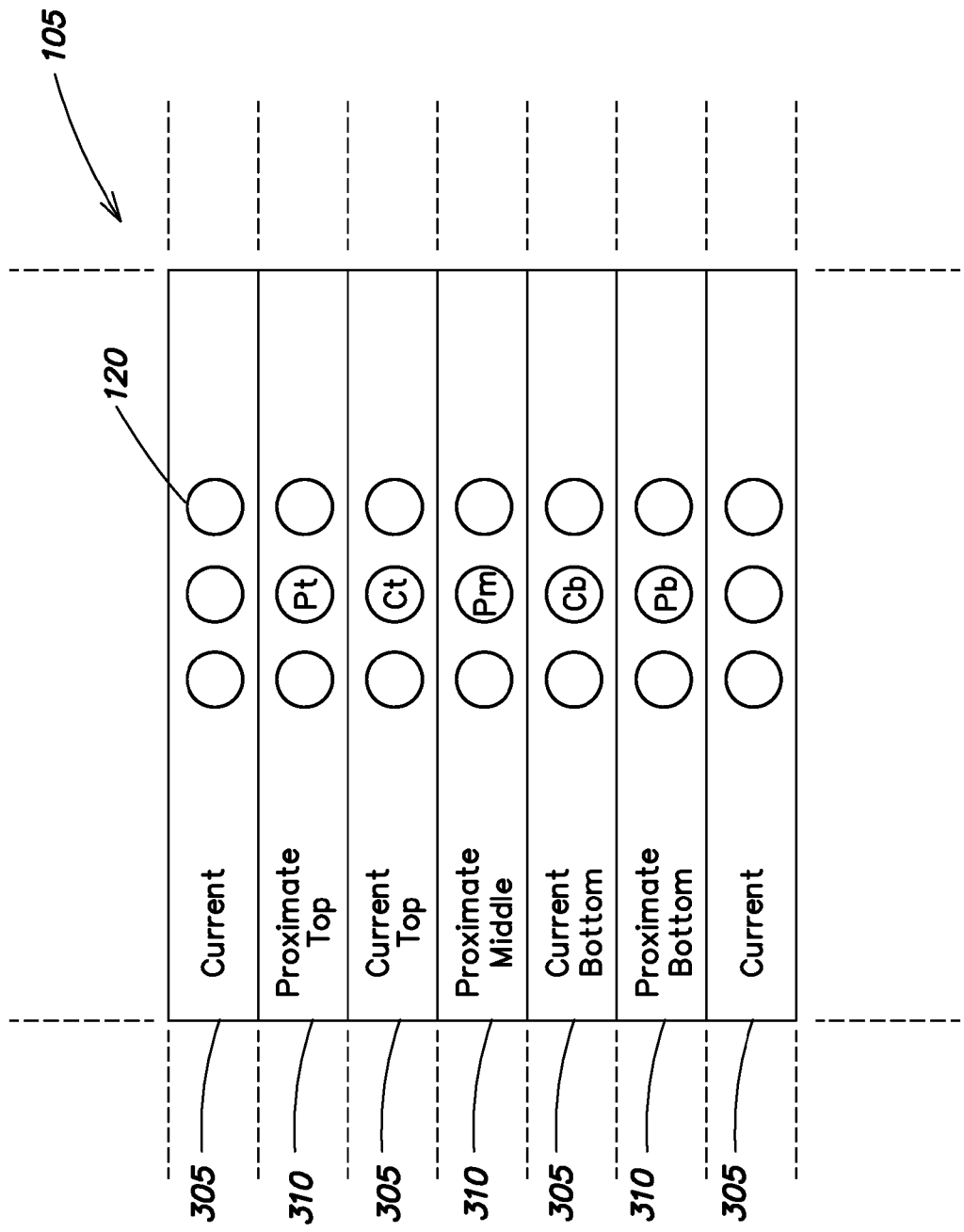
FIG. 3 is a diagram depicting a frame of a video signal in accordance with an embodiment of the invention.

For example, and with reference to FIG. 3, which is a diagram depicting frame 105 of video signal 100 in accordance with an embodiment of the invention, motion detector unit 205 may evaluate a plurality of adjacent field lines of alternating parity, (e.g. of odd field 110 and even field 115) to generate at least one differential value. Although any number of adjacent field lines may be present in frame 105, FIG. 3 depicts five vertically adjacent field lines of two consecutive fields, a current field 305, and a proximate field 310 of video signal 100. It should be appreciated that current field 305 can be either odd field 110 or even field 115, and that proximate field 310 can be either odd field 110 or even field 115.

As illustrated in FIG. 3, current field 305 includes a current top field line and a current bottom field line, and proximate field 310 includes a proximate top field line, a proximate middle field line, and a proximate bottom field line. This nomenclature is for ease of description and is not limiting. In one embodiment, motion detector unit 205 evaluates any pixel 120 from current field 305. For example, motion detector unit 205 may evaluate any pixel 120, such as pixel Ct of FIG. 3, which represents a pixel from the current top field line of current field 305. In this embodiment, motion detector 305 can generate at least one differential value based on a comparison of values of pixel Ct with values of other pixels 120 from any field lines from both current field 305 and proximate field 310. Buffer 210 or other memory storage unit associated with motion detector circuit 200 may store values associated with pixels from at least one of current field 305 and proximate field 310. Motion detector unit 205 may evaluate these buffered values to obtain differential values associated with pixel Ct.

With continued reference to FIGS. 1-3, in one embodiment motion detector unit 205 identifies motion of pixel Ct of current top field line of current field 305. For example, motion detector unit 205 may receive values of a pixel 120 from each of current top field line (pixel Ct), current bottom field line (pixel Cb), proximate top field line (pixel Pt), proximate middle field line (pixel Pm), and proximate bottom field line (pixel Pb) as input. In one embodiment, video signal 100 sequentially scans a field of a first parity and a second parity, (e.g., current field 305 and proximate field 310,) and values of pixels from one field, such as proximate field 310, may be buffered, for example by buffer 210.

Continuing with this illustrative embodiment, to determine motion of pixel Ct, motion detector unit 205 can generate a plurality of differential values based on a comparison of pixel Ct values with combinations of values of pixels Ct, Cb, Pt, Pm, and Pb. In one embodiment, these five pixels can be included in one of five field lines of two fields of alternating parity. For example, these five pixels may be vertically aligned in a column of five field lines as depicted in FIG. 3.

In one embodiment, motion detector unit 205 evaluates five pixels, (e.g., pixels Ct, Cb, Pt, Pm, and Pb) to generate three differential values. For example, when motion detector circuit 200 determines a measure of motion for pixel Ct, a first differential value may be obtained by evaluating pixels Pt and Pm, which include pixels 120 from proximate field 310. With respect to pixel Ct and current top field line of current field 305, pixels Pt and Pm are from adjacent field lines of a different parity.

With continued reference to FIGS. 1-3, in various embodiments both the number of pixels evaluated and the number of differential values generated by motion detector unit 205 can vary. For example, to determine a measure of motion of pixel Ct, a differential value may be the difference between a value of pixel Ct and an average of the values of pixels Pt and Pm. Another differential value may be the difference between a value of pixel Cb and an average of the values of pixels Pm and Pb. Another differential value may be the difference between the average of values of pixels Ct and Cb, and a value of pixel Pm. It should be appreciated that a plurality of operations can be performed on the values of pixels Ct, Cb, Pt, Pm, and Pb to determine various differential values.

Continuing with the embodiment illustrated above, where, for example, three differential values can be obtained to determine a measure of motion of pixel Ct, motion detector unit 205 may determine the sign of each differential value. For example, the sign of a differential value may be positive, negative, or zero. Logic elements of motion detector circuit 200, such as motion detector unit 205, can perform a sign function operation, (also referred to as a signum function) to identify a sign of any differential value. In one embodiment, motion detector unit 205 can evaluate each differential unit and determine that each differential value has a same sign. For example, motion detector unit 205 can determine that each differential value is positive, that each differential value is negative, or that each differential value is zero. In one embodiment, motion detector unit 205 may indicate that, for example, pixel Ct includes some measure of motion when a plurality of differential values have the same sign. In an another embodiment, motion detector unit 205 may determine that any pixel 120, such as pixel Ct is not associated with motion when at least two differential vales associated with pixel Ct have different signs.

Equation 1, reproduced below, illustrates an example of a sign function that can be used by motion detector unit 205.

$$\text{sgn}(x) = \begin{cases} -1 : x < 0 \\ 0 : x = 0 \\ +1 : x > 0 \end{cases} \quad (1)$$

In one embodiment, where motion detector unit 205 indicates that each differential value is of a same sign, elements of motion detector circuit 200 may compare at least one differential value with at least one threshold value. Threshold values can be programmable and their values can vary. Motion detector circuit 200 may include at least one comparator unit 215. Comparator unit 215 may include a circuit or logic devices to compare differential values with threshold values. Comparator unit 215, which may form part of motion detector unit 205 or be a separate unit of motion detector circuit 200, may also evaluate a plurality of differential values to determine if they are of a same sign.

For example, comparator unit 215 may evaluate a plurality of differential values that have a same sign against a plurality of threshold values. A number of potential results of a comparison between at least one differential value and at least one threshold value may indicate motion of any pixel 120, such as current top line pixel Ct of current field 305. For example, motion may be detected when at least one differential value is greater than, less than, or equal to at least one threshold value. Motion associated with a pixel may also be detected when an absolute value of at least one differential value is, for example, greater than at least one threshold value. In one embodiment, pixel 120 motion can be detected when each differential value is compared against a different threshold value, and when each differential value is greater than its corresponding threshold value. Varying degrees of motion of one or more pixel 120 may be detected. For example, each of a plurality of differential values, or absolute values thereof may be compared against a respective threshold value, and the amount or magnitude of pixel 120 motion may be indicated by the number of differential values that are greater than their respective threshold value. In one embodiment, the amount by which a differential value exceeds a threshold value may indicate a greater or lesser magnitude of pixel 120 motion.

In one embodiment, a measure of motion of at least one pixel 120 of video signal 100 can be obtained based on, for example, at least one of a determination that a plurality of differential values have a same sign, and a comparison of at least one differential value with at least one threshold value. This measure of motion may include a motion coefficient that indicates that motion associated with any pixel 120 does or does not exist. In one embodiment, a motion coefficient may be generated for a plurality of pixels of video signal 100 and provided to, for example, one or more control circuits 220 for further processing. In one embodiment, control circuit 220, which may be part of or associated with motion detector circuit 200, can provide the motion coefficient or other indication of pixel 120 motion to one or more processor circuits 225. In another embodiment, any of motion detector 205, comparator 215, and control circuit 220 may provide a motion coefficient or other indication of pixel 120 motion to processor circuit 225, which can also receive video signal 100. This data can assist processor circuit 225 in selecting the optimal deinterlacing or other processing scheme to generate at least one output video signal 230 free of unwanted motion artifacts encoded into video signal 100.

The plurality of pixels 120 evaluated to generate differential values need not be ordered in a column through five adjacent field lines of frame 105 as illustrated in FIG. 3. For example, FIG. 4, which is a diagram depicting frame 105 of video signal 100 in accordance with an embodiment of the invention, illustrates a plurality of pixels 120 that form a diagonal through a plurality of adjacent field lines. For example, motion detector unit 205 may evaluate pixels 120 to identify gradients within a region of frame 105 and associated with pixels 120 that form a diagonal through a plurality of field lines. At least one of the pixels 120 that form a diagonal may be evaluated to determine if it associated with motion in the image represented by video signal 100.

In one embodiment, a measure of motion of pixel Ct may be generated based on differential values between pixels 120 that include pixel Ct and that form a diagonal through plurality of field lines. For example, with reference to FIG. 4, motion of pixel Ct can be determined by evaluating values of pixel Ct and pixels Cb, Pt, Pm, and Pb, that form a diagonal together with pixel Ct through a plurality of field lines of consecutive fields, e.g. two field lines of current field 305 and three field lines of proximate field 310.

In one embodiment, a plurality of differential values may be determined when motion of pixel Ct is assessed based on values of a plurality of pixels that form a diagonal through a plurality of field lines of consecutive fields of frame 105. For example, to determine a measure of motion of pixel Ct, a differential value may be a weighted average of values of proximate field line pixels Pt, Pm, and Pb, or any fraction thereof. In one embodiment, a first differential value may include one fourth of a sum of the values of proximate field 310 pixels Pt and Pb and twice the value of pixel Pm, and a second differential value may be the average value of current field 305 pixels Ct and Cb.

In one embodiment, an element of motion detector circuit 200, such as motion detector unit 205 or comparator unit 215, may generate at least one differential value based on an evaluation of at least one other differential value. For example, when first and second differential values between pixels forming a diagonal are generated as described above, a third differential value may be the difference between the first differential value and the second differential value, or an absolute value thereof. In this illustrative embodiment, a differential value generated based on an evaluation of a plurality of other differential values indicates an estimated level of interfield contrast between, for example, current field 305 and missing field 310.

Continuing with this illustrative embodiment, where a third differential value can be generated based on an evaluation of first and a second differential values, motion detector unit 205 or other motion detector circuit 200 element may implement a sign function, as described herein, to determine a sign of each differential value. In one embodiment, when each differential value is of a same sign, at least one of the differential values may be compared with at least one threshold value. For example, the third differential value, which may be a function of the first and second differential values, may be compared to at least one threshold to generate a motion coefficient indicative of a magnitude of motion associated with pixel Ct based in part on the differential value being greater than, equal to, or less than one or more threshold values. In one embodiment, pixel Ct may be determined to have no motion when at least two differential values have different signs.

Figure 4:
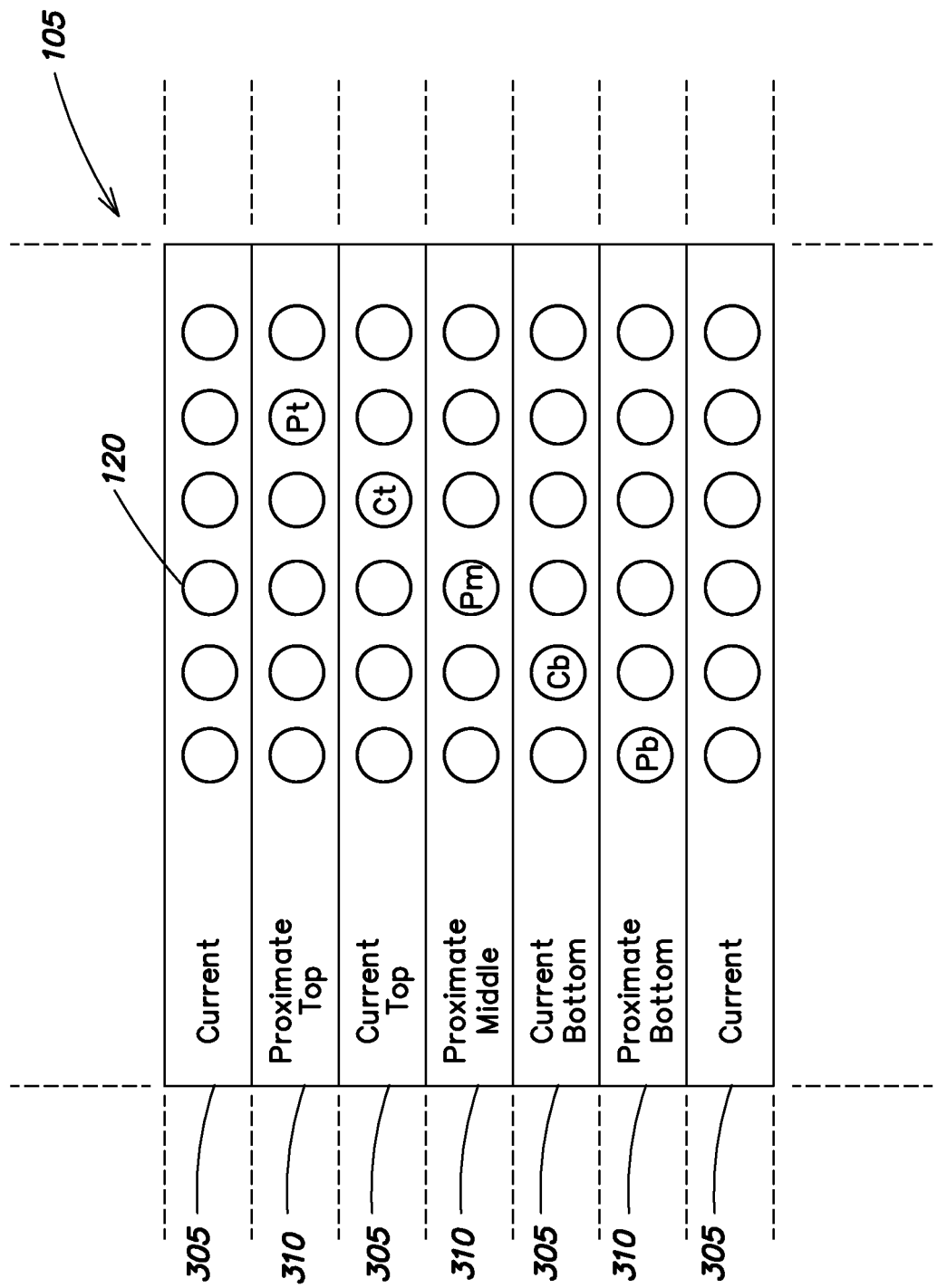
FIG. 4 is a diagram depicting a frame of a video signal in accordance with an embodiment of the invention.

With continued reference to FIG. 4, in one embodiment, the third differential value can be compared with a plurality of different cascading threshold values. For example, a differential value associated with pixel Ct and generated based on an evaluation of other differential values may be compared to a first threshold value. If the differential value is, for example, greater than the first threshold value, a motion coefficient indicating a measure of motion of pixel Ct may be generated.

Continuing with this illustrative embodiment, if the differential value is less than or equal to a first threshold value, the differential value may be compared to a second threshold value that may be, for example, less than the first threshold value. In this example, if the differential value less than or equal to the first threshold value but greater than the second threshold value, then a motion coefficient indicating a measure of motion of pixel Ct may be generated. If the differential value is less than both the first and second threshold values, it may then be compared with a third threshold value. It the differential value is greater than the third threshold value a motion coefficient indicating a measure of motion of pixel Ct may be generated. These iterations comparing the differential value against decreasing threshold values may continue until, for example, the differential value is greater than a threshold value, or until it is determined that pixel Ct is not associated with motion. It should be appreciated that this example is illustrative, and in various embodiments motion coefficients or other indicators of pixel motion can be generated based varying relationships between differential values and threshold values. For example, in one embodiment differential values that are less than or equal to at least one threshold value may indicate pixel 120 motion.

Figure 5:
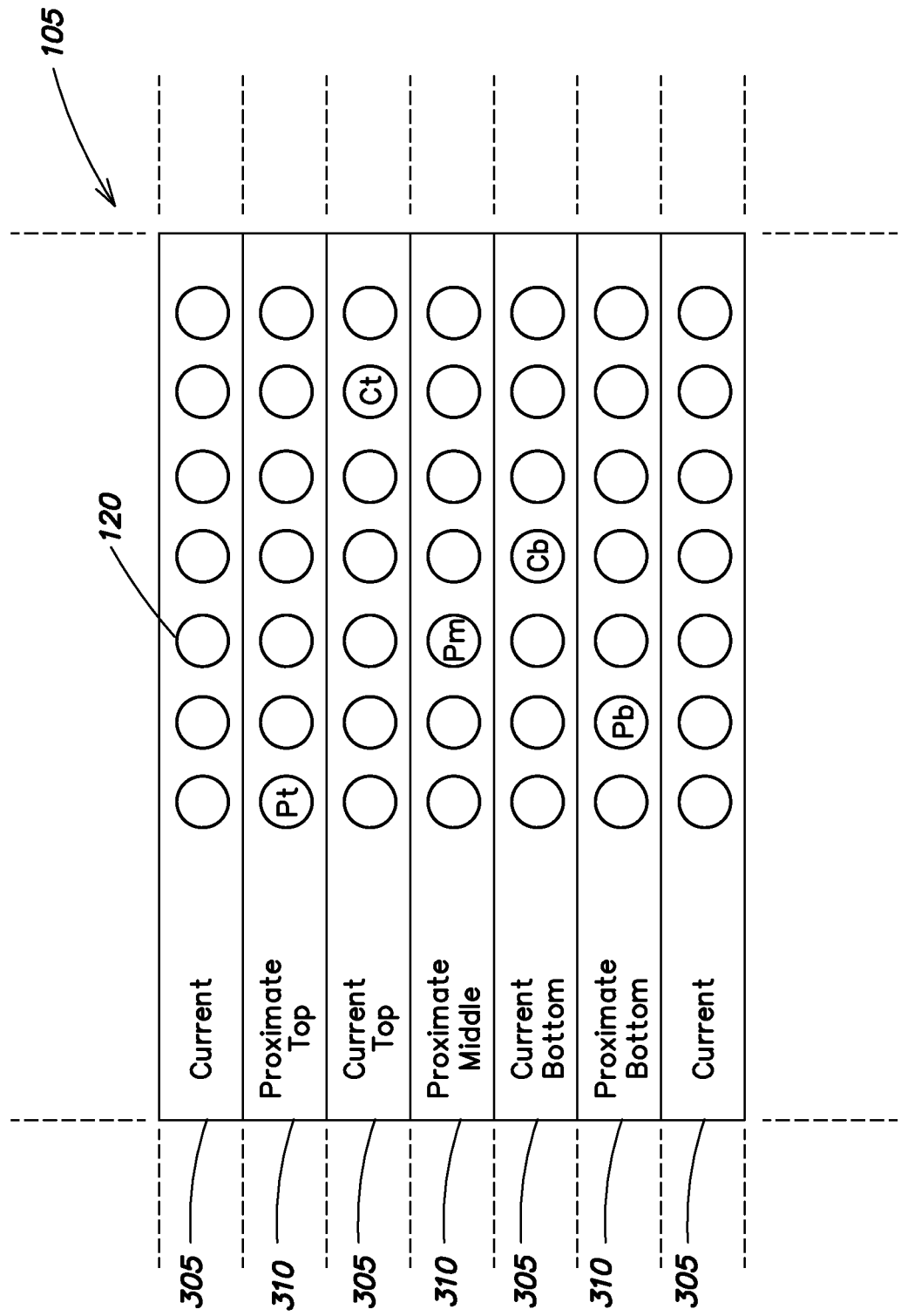
FIG. 5 is a diagram depicting a frame of a video signal in accordance with an embodiment of the invention.

In one embodiment, the plurality of pixels 120 evaluated to generate differential values are neither ordered in a column through a plurality of adjacent field lines nor ordered on a diagonal through a plurality of adjacent field lines as respectively illustrated in FIGS. 3 and 4. For example, FIG. 5, which is a diagram depicting frame 105 of video signal 100 in accordance with an embodiment of the invention, illustrates a plurality of pixels 120 located in a disconnected non-linear fashion in plurality of adjacent field lines. As illustrated in FIG. 5, to determine a measure of motion for pixel Ct of current field 305, motion detector unit 205 may evaluate a plurality of pixels 120 of various field lines of current field 305 and proximate field 310 to generate at least one differential value. For example, motion detector unit 205, (or other elements of motion detector circuit 200) may evaluate values of pixels Ct and Cb from field lines of current field 305, and pixels Pt, Pm, and Pb from field lines of proximate field 310. In various embodiments, more that one pixel from a field line may be evaluated to determine motion of any pixel 120, such as pixel Ct for example.

In general, motion detector unit 205 may detect motion for any one pixel 120 in any field line of frame 105 by generating at least one differential value based on an evaluation of at least two pixels 120 of frame 105. These two pixels 120 may be in the same field line or different field lines, and may belong to the same or different fields, (e.g., have a same or different parity.) At least one differential value may be generated based on a value of at least one other differential value and values of any pixels 120, or based on an evaluation of a plurality of differential values. In one embodiment, motion can exist when at least two differential values have the same sign, and motion may not exist when at least two differential values have a different sign. In one embodiment, at least one differential value can be compared to at least one threshold value to generate a motion coefficient indicative, for example, of a magnitude of motion of any pixel 120. The motion coefficient may indicate that pixel 120 is not associated with motion.

It is noted that for the purposes of clarity of FIGS. 1, 3, 4, and 5, reference identifier 120 is directed to only a single pixel in each Figure. It is appreciated, however, that any pixel illustrated in the Figures as a circle, including pixels Ct, Cb, Pt, Pm, and Pb, is one of pixels 120. Although embodiments, aspects, and examples described herein determine a motion of pixel Ct that is part of a field line of current field 305, any pixel 120 from any field line of any field, (e.g., odd field 110, even field 115, current field 305, or proximate field 310) may be evaluated by motion detector circuit 200 to determine motion. In one embodiment, every pixel 120 from video signal 100 that is received by motion detector circuit 200 is evaluated to determine, detect, or identify motion.

A detection of motion of any pixel 120, such as pixel Ct, may indicate the presence of an unwanted and visually perceptible artifact that is present in video signal 100. This artifact may have been introduced due to motion of an object during the time period between the scans of two consecutive fields, (e.g., odd field 110 and even field 115, or current field 305 and proximate field 310,) for example. In video signal 100 this object may appear to be in a different location for each of the two consecutive fields. Displaying consecutive fields in one frame of output video signal 230 can result in the appearance of unwanted artifacts. For example, an object can be in one location in one field of a frame, (e.g., half of the field lines) and in another location in another field of the frame (e.g., the other half of the field lines.) These unwanted artifacts can be referred to as mouse-teeth, jaggies, combing, or feathering, and they distort the image encoded in video signal 100.

Detecting pixels 120 associated with motion between two consecutive fields of frame 105 and providing this information to processor circuit 225 can enable processor circuit 225 to select a deinterlacing or other processing scheme that can remove artifacts from output video signal 230. This results in an output video signal 230 that may be displayed on any display with reduced or eliminated artifacts. Processor circuit 225 may receive video signal 100 and may also receive from motion detector circuit 200 a motion coefficient or other indication of, for example, motion of pixel Ct. In one embodiment, processor circuit 225 can evaluate these inputs to determine if pixel Ct is associated with an edge of an image in video signal 100 based at least in part on an evaluation of the motion coefficient. Edge detection can enable processor circuit 225 to sharpen or process video signal 100 to further improve the display of output video signal 230. In various embodiments output video signal 230 includes at least one of a progressive video signal and an interlaced video signal, and processor circuit 225 may include a deinterlacer circuit. In one embodiment, processor circuit 225 evaluates information received from motion detector circuit 200 regarding motion of any pixel 120 to detect cadence of video signal 100. For example, based at least in part on a motion coefficient of any pixel 120, processor circuit 225 may determine that video signal 100 was generated using a 2:2 pull down technique or a 3:2 pull down technique.

Processor circuit 225 may generally implement a plurality of pixel interpolation, weaving, or other functions responsive at least in part to data generated by motion detector circuit 200 indicative of pixel motion to improve a display of output video signal 230. A display generally includes a device that can receive video data and provide a representation of that data in human perceptible form. Examples of display devices include screen display devices such as televisions, computer monitors, personal digital assistants or cell phone screens, and projection display devices.

Figure 6:
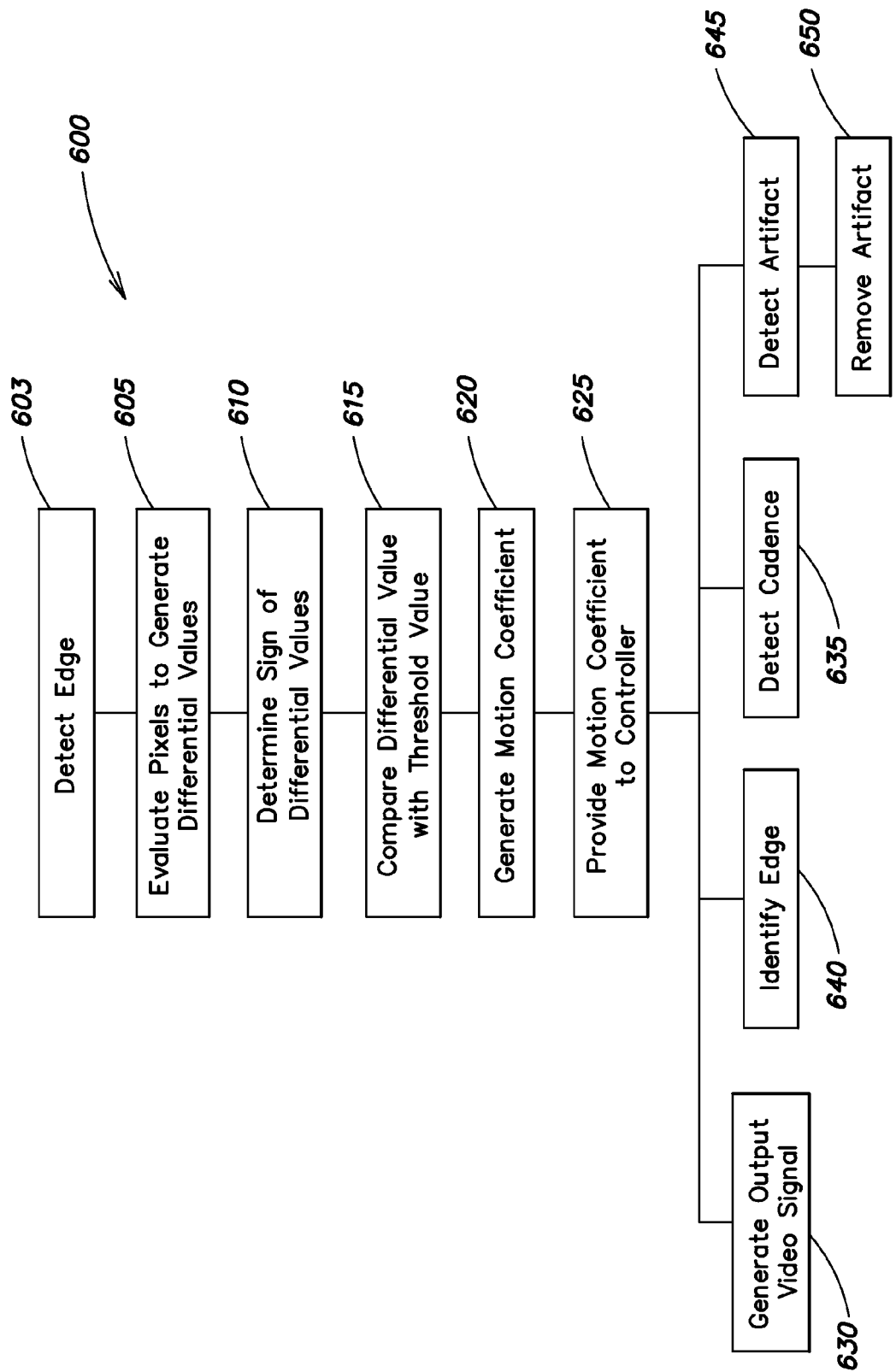
FIG. 6 is a flowchart depicting a method for determining motion in a video signal in accordance with an embodiment of the invention.

FIG. 6 is a flowchart depicting a method 600 for determining motion in a video signal in accordance with an embodiment of the invention. Method 600 may include an act of detecting an edge of an image represented by a video signal (ACT 603). Detecting an edge (ACT 603) may be based at least in part on a motion coefficient or other indication of pixel motion. In one embodiment, detecting an edge (ACT 603) includes a circuit such as a motion detector circuit or a processor circuit evaluating motion coefficients or other pixel data such as luminance, chrominance, hue, or saturation of one or more pixels to determine if a pixel is associated with an edge.

Method 600 may include an act of evaluating a plurality of pixels to generate a plurality of differential values, (ACT 605). In one embodiment, evaluating a plurality of pixels (ACT 605) includes evaluating a plurality of data corresponding to at least one of a plurality of pixels. For example, pixels represented in a video signal may include data regarding motion, luminance, chrominance, hue, saturation, or other characteristics, data, or values. Evaluating a pixel (ACT 605) may include evaluating and data associated with or corresponding to a pixel that is part of a video signal such as an interlaced video signal or a progressive video signal.

In one embodiment, evaluating one or more pixels to generate one or more differential values (ACT 605) includes performing mathematical operations on one or pixels to generate one or more differential values. For example, evaluating the plurality of pixels (ACT 605) may include evaluating at least one pixel from each of two field lines of a first parity, and evaluating at least one pixel from each of three field lines of a second parity, where each of the three field lines can be adjacent to at least one of the two field lines. In one embodiment, evaluating at least one pixel to generate differential values (ACT 605) includes evaluating at least one pixel from five field lines of two consecutive fields of alternating parity, such as a pixel from each of five field lines of a frame of a video signal. For example, evaluating a plurality of pixels (ACT 605) can include evaluating five or more pixels from five or more field lines, where the pixels form a column in the five or more field lines.

Evaluating one or more pixels (ACT 605) may include generating one or more differential values associated with at least one of the pixels. For example, evaluating a pixel (ACT 605) may include generating a first differential value, a second differential value, and a third differential value by, for example, performing mathematical operations on values associated with a plurality of pixels of a plurality of field lines of a frame of the video signal. In one embodiment, evaluating one or more pixels (ACT 605) includes generating a first differential value and a second differential value, and generating a third differential value based on an evaluation of the first and second differential values. In one embodiment, evaluating one or more pixels (ACT 605) includes identifying at least one edge of an image represented by a video signal. For example, a motion detector circuit or processor circuit such as a deinterlacer circuit can evaluate video signal pixel data to determine the existence of an edge. In one embodiment, evaluating one or more pixels (ACT 605) evaluates pixels determined or identified as pixels associated with an edge.

Evaluating one or more pixels (ACT 605) to determine a measure of motion of a targeted pixel of a field line of a first parity may include generating a differential value by determining the difference between a value of the targeted pixel and an average of the values of two other pixels, each of the two other pixels from adjacent field lines of a second parity. In one embodiment, evaluating a plurality of pixels (ACT 605) to determine a measure of motion of a targeted pixel of a field line of a first parity includes generating a differential value by determining a difference between a value of a pixel from a second field line of the first parity and an average of the values of two other pixels from adjacent field lines of a second parity. In another embodiment where evaluating one or more pixels (ACT 605) includes generating a differential value, the differential value may be generated by determining the difference between the average of values of a targeted pixel of a first field line of a first parity and a pixel from a second field line of the first party, and a value of a pixel from a field line of a second parity, where the field line of the second parity is adjacent to at least one of the field lines of the first parity. It should be appreciated that a plurality of mathematical operations may be performed when evaluating one or more pixels (ACT 605) to determine or generate various differential values.

In one embodiment, evaluating the plurality of pixels (ACT 605) includes evaluating five or more pixels that form a diagonal through a plurality of field lines of a frame of a video signal. For example, pixels may be evaluated (ACT 605) to generate a plurality of differential values associated with a targeted pixel of a first field line of a first parity to determine motion of the targeted pixel. For example, evaluating a plurality of pixels (ACT 605) to determine a measure of motion of a targeted pixel of a first field line may include generating a differential value that is a weighted average of values of three pixels, (e.g., where a pixel value of at least one of the three may be doubled or otherwise weighted,) each of the three pixels being from a field line of a field having a second parity, or any fraction thereof, such as one fourth of this average, for example. Evaluating one or more pixels (ACT 605) may also include generating a differential value that is the average of a targeted pixel of a first field line of a first parity and a pixel of a second field line of the first parity. In one embodiment, evaluating one or more pixels (ACT 605) includes generating a differential value based on an evaluation of at least one other differential value. For example, when first and second differential values between pixels forming a diagonal are generated as described above, evaluating one or more pixels (ACT 605) may include generating a third differential value that is the difference between the first differential value and the second differential value, or an absolute value thereof.

Method 600 may also include an act of determining the signs of least two differential values (ACT 610). In one embodiment, determining signs of a plurality of differential values (ACT 610) includes determining that each differential value is of a same sign. For example, method 600 may employ a signum function to determine that a plurality of differential values are of a same sign (ACT 610). In one embodiment, evaluating differential values to determine that they have the same sign (ACT 610) includes determining that each differential value is positive, that each differential value is negative, or that each differential value is zero. In one embodiment, determining that a plurality of differential values have the same sign includes indicating that, for example, a pixel is associated with some measure of motion. In another embodiment, determining signs of a plurality of differential values (ACT 610) includes determining that at least two differential vales have different signs. In this illustrative embodiment, a pixel associated with at least one of the plurality of differential values may not be associated with motion.

Method 600 may also include the act of comparing at least one differential value with at least one threshold value (ACT 615). In one embodiment, comparing at least one differential value with at least one threshold value (ACT 615) includes comparing an absolute value of at least one differential value with a corresponding threshold value. For example, this may include comparing an absolute value of a first differential value with a first threshold value, an absolute value of a second differential value with a second threshold value, and an absolute value of a third differential value with a third threshold value. This comparing act (ACT 615) may also include comparing at least one differential value with a plurality of threshold values. Motion associated with a pixel may be detected when, for example, an absolute value of at least one differential value is, for example, greater than at least one threshold value.

Method 600 may also include an act of generating a motion coefficient (ACT 620). In one embodiment, generating a motion coefficient (ACT 620) may include generating a motion coefficient indicative of a magnitude of motion associated with one of a plurality of pixels. Generating a motion coefficient (ACT 620) may be responsive to the act of comparing at least one differential value with at least one threshold value (ACT 615). In one embodiment, generating the motion coefficient (ACT 620) includes generating data indicating that at least one of the absolute value of the first differential value is greater than the first threshold value, the absolute value of the second differential value is greater than the second threshold value, and the absolute value of the third differential value is greater than the third threshold value.

For example, generating a motion coefficient (ACT 620) may include generating a number indicative of an amount of motion associated with a pixel. For example, generating a motion coefficient (ACT 620) may include generating a coefficient that any pixel of a video signal may or may not be associated with motion. In one embodiment, generating a motion coefficient (ACT 620) of at least one pixel of a video signal may include at least one of a determination that a plurality of differential values have a same sign (ACT 610), and a comparison of at least one differential value with at least one threshold value (ACT 615).

Method 600 may include at least one of an act of providing a motion coefficient to a controller (ACT 625) and generating an output signal such as a progressive video signal associated with a video signal that includes an interlaced video signal (ACT 630). Providing the motion coefficient to a controller (ACT 625) may include transmitting, outputting, or providing data indicative of a magnitude of motion associated with a pixel from a motion detector circuit to a processor circuit. Generating the output signal (ACT 630) may include generating an output video signal based at least in part on an evaluation of at least one motion coefficient.

In one embodiment, method 600 includes an act of detecting cadence (ACT 635) of a video signal. For example, detecting cadence (ACT 635) may include detecting cadence of the video signal based at least in part on an evaluation of data such as a motion coefficient indicative of a magnitude of motion associated with a pixel. In one embodiment, detecting cadence (ACT 635) includes identifying and evaluating motion between fields of a frame. For example, a comparison of consecutive fields of a video signal may generate repetitive patterns of values. The patterns of these values can be evaluated to determine cadences of video signals.

Method 600 may also include an act of identifying an edge of an image represented by a video signal (ACT 640). Detecting an edge (ACT 640) may be based at least in part on a motion coefficient or other indication of pixel motion. In one embodiment, detecting an edge (ACT 640) includes at least one of a motion detector circuit and a processor circuit evaluating a motion coefficient or other motion related data of a pixel of a video signal to determine if that pixel is associated with an edge.

In one embodiment, method 600 includes an act of detecting at least one artifact (ACT 645). For example, detecting an artifact (ACT 645) may include detecting or identifying an artifact associated with one of a plurality of pixels of a video signal based, for example, on an evaluation of a motion coefficient or other motion related data associated with a pixel. Detecting an artifact (ACT 645) may include at least one of a processor circuit and a motion detection circuit analyzing pixel values of a video signal to detecting an artifact. Method 600 may also include an act of removing at least one artifact (ACT 650). For example, removing an artifact (ACT 650) may include removing at least one artifact so that the artifact does not appear or is less visually perceptible in a display of an output video signal generated from an interlaced video signal. Removing an artifact (ACT 650) may include a deinterlacer circuit processing a video signal that includes an interlaced video signal and motion related data associated with pixels of the interlaced video signal to identify and remove an artifact. In one embodiment, one or more of the acts of generating an output video signal (ACT 630), detecting cadence (ACT 635), identifying an edge (ACT 640), detecting an artifact (ACT 645), and removing an artifact (ACT 650) may be responsive to the act of providing the motion coefficient to the controller (ACT 625), and any of these acts may be implemented by a processor circuit or unit.

Note that in FIGS. 1 through 6, the enumerated items are shown as individual elements. In actual implementations of the systems and methods described herein, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it is appreciated that the systems and methods for determining motion in a video signal described herein afford a simple and effective way to improve a display of a video signal. The two field deinterlacing systems and methods according to various embodiments described herein generate pixel 120 motion data while processing a minimal amount of input data, (e.g., pixels 120 from two fields.) This reduces memory, data storage, bandwidth, and processor power requirements, increases efficiency, and reduces cost.

Any references to front and back, left and right, top and bottom, and upper and lower, horizontal and vertical and the like are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references such as "an embodiment", "some embodiments", "an alternate embodiment", "various embodiments", or the like are not necessarily mutually exclusive and are intended to indicate that a particular feature, structure, or characteristic described in connection with the embodiment may be included in at least one embodiment. The appearances of such terms herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

Where technical features mentioned in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the spirit or essential characteristics thereof. For example, motion detector circuit 200 is compatible with both 2 field and 3 field deinterlacing schemes implemented by processor circuit 225 and can provide output video signal 230 to both standard and high definition displays including DVD, DTV, BlueRay, HDDVD, MPEG Transport Stream, HDMI and other high definition display outputs, protocols, and formats. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. A method for detecting field motion in an interlaced video signal having a first field and a second field of different parity, the method comprising:
    selecting a plurality of pixels of a plurality of adjacent field lines of alternating parity of the video signal, each pixel of the plurality of pixels corresponding to a different field line of the plurality of adjacent field lines of alternating parity, the plurality of pixels including a first subset having at least a first pixel from the first field, and a second subset having at least a second pixel from the second field;
    generating a plurality of differential values using the plurality of pixels, each differential value of the plurality of differential values being a difference based on a value of at least one pixel in the first subset and a value of at least one pixel in the second subset;
    determining that each differential value of the plurality of differential values is of a same sign;
    comparing at least one differential value of the plurality of differential values with a threshold value; and
    generating, responsive to the comparing, a motion coefficient indicative of a magnitude of motion associated with one of the plurality of pixels.

2. The method of claim 1, further comprising:
    generating, based at least in part on an evaluation of the motion coefficient, a progressive video signal corresponding to the interlaced video signal.

3. The method of claim 1, comprising:
    detecting cadence of the video signal based at least in part on an evaluation of the motion coefficient.

4. The method of claim 1, wherein selecting the plurality of pixels comprises:
    selecting one pixel from each of two field lines of a first parity; and
    selecting one pixel from each of three field lines of a second parity, each of the three field lines being adjacent to at least one of the two field lines.

5. The method of claim 4, wherein generating the motion coefficient comprises generating a motion coefficient associated with a pixel of one of the two field lines.

6. The method of claim 1, wherein the plurality of adjacent field lines of alternating parity comprises five field lines of alternating parity, and wherein selecting the plurality of pixels comprises selecting a pixel from each of the five field lines.

7. The method of claim 6, wherein selecting the pixel from each of the five field lines comprises selecting five pixels that are vertically aligned in a column of the five field lines.

8. The method of claim 6, wherein selecting the pixel from each of the five field lines comprises selecting five pixels that form a diagonal through the five field lines.

9. The method of claim 6, wherein selecting the pixel from each of the five field lines comprises selecting five pixels that form a disconnected non-linear pattern through the five field lines.

10. The method of claim 1, wherein comparing at least one differential value comprises comparing an absolute value of each differential value with a corresponding threshold value.

11. The method of claim 1, wherein:
    generating a plurality of differential values using the plurality of pixels comprises generating a first differential value, a second differential value, and a third differential value; and wherein
    comparing the at least one differential value with the threshold value comprises comparing an absolute value of the first differential value with a first threshold value, comparing an absolute value of the second differential value with a second threshold value, and comparing an absolute value of the third differential value with a third threshold value.

12. The method of claim 1, wherein generating a plurality of differential values using the plurality of pixels comprises generating a first differential value and a second differential value, and further comprising:
    generating a third differential value based on the first and second differential values.

13. The method of claim 12, wherein comparing the at least one differential value with the threshold value further comprises:
    comparing the third differential value with a plurality of threshold values.

14. The method of claim 11, wherein generating the motion coefficient comprises generating data indicating that at least one of the absolute value of the first differential value is greater than the first threshold value, the absolute value of the second differential value is greater than the second threshold value, and the absolute value of the third differential value is greater than the third threshold value.

15. The method of claim 1, further comprising at least one of:
    identifying an edge based in part on the motion coefficient; and
    identifying an artifact based in part on the motion coefficient.

16. The method of claim 1, further comprising:
    detecting an artifact associated with one of the plurality of pixels; and
    removing the artifact from the video signal.

17. The method of claim 1, wherein selecting the plurality of pixels, generating the plurality of differential values, determining that each differential value is of the same sign, comparing at least one differential value with the threshold value, and generating the motion coefficient are performed at least in part by a processor, and wherein the method is implemented at least in part by a program stored in a computer readable medium and executed by the processor.

18. A field motion detector circuit, comprising:
    a motion detector unit configured to receive a plurality of pixels of an interlaced video signal having a plurality of adjacent field lines of alternating parity, each pixel of the plurality of pixels corresponding to a different field line of the plurality of adjacent field lines of alternating parity, the plurality of pixels including a first subset having at least a first pixel from a first field of the interlaced video signal and a second subset having at least a second pixel from a second field of the interlaced video signal, the motion detector unit further being configured to:
        generate a plurality of differential values using the plurality of pixels, each differential value of the plurality of differential values being a difference based on a value of at least one pixel in the first subset and a value of at least one pixel in the second subset;

determine that each differential value of the plurality of differential values is of a same sign; and a comparator unit configured to compare at least one differential value of the plurality of differential values with at least one threshold value to generate a motion coefficient indicative of a magnitude of motion associated with one of the plurality of pixels.

19. The motion detector circuit of claim 18, further comprising:

a control circuit configured to receive the motion coefficient; and a deinterlacer circuit configured to receive the interlaced video signal and provide a progressive video signal based at least in part on control circuit evaluation of the motion coefficient.

20. The motion detector circuit of claim 18, wherein the motion detector unit is configured to receive one pixel from each of two field lines of a first parity, and one pixel from each of three field lines of a second parity, each of the three field lines located adjacent to at least one of the two field lines.

21. The motion detector circuit of claim 20, wherein the motion coefficient is associated with a pixel from one of the two field lines of the first parity.

22. The motion detector circuit of claim 18, wherein the adjacent field lines include five field lines of alternating parity, and wherein the motion detector unit is configured to receive one pixel from each of the five field lines.

23. The motion detector circuit of claim 22, wherein the one pixel from each of the five field lines form a vertical column through the five field lines.

24. The motion detector circuit of claim 18, wherein the motion detector unit is configured to generate a first differential value, a second differential value, and a third differential value; and wherein the comparator is configured to compare an absolute value of the first differential value with a first threshold value, an absolute value of the second differential value with a second threshold value, and an absolute value of the third differential value with a third threshold value to generate the motion coefficient.

25. The motion detector circuit of claim 22, wherein the one pixel from each of the five field lines form a diagonal through the five field lines.

26. The motion detector circuit of claim 22, wherein the one pixel from each of the five field lines form a disconnected non-linear pattern through the five field lines.

27. The motion detector circuit of claim 18, wherein the motion detector unit is configured to generate a first differential value, a second differential value, and a third differential value, wherein the third differential value is based on the first and second differential values.

28. The motion detector circuit of claim 27, wherein the comparator unit is configured to compare the third differential value with a plurality of threshold values to generate the motion coefficient.

29. The motion detector circuit of claim 18, wherein the comparator unit is configured to compare an absolute value of each differential value with the at least one threshold value.

30. The motion detector circuit of claim 18, wherein the motion coefficient indicates that the absolute value of at least one differential value is greater than the at least one threshold value.

31. The motion detector circuit of claim 19, wherein the deinterlacer circuit is further configured to provide at least one of a pixel interpolation value and a pixel weaving value.

32. The motion detector circuit of claim 18, wherein the motion detector unit further comprises a motion detector hardware device, and wherein the comparator unit further comprises a comparator hardware device.

33. The motion detector circuit of claim 18, wherein the motion detector unit is configured to process software, and wherein the comparator unit is configured to process software.

34. The method of claim 1, wherein determining that each differential value of the plurality of differential values is of a same sign includes:

determining a plurality of signs of the plurality of differential values, each respective sign of the plurality of signs being determined by applying a sign function to a respective differential value of the plurality of differential values; and determining that each respective sign of the plurality of signs is the same sign.

35. The method of claim 1, wherein the first subset includes a first plurality of pixels from the first field and the second subset includes a second plurality of pixels from the second field, at least one differential value of the plurality of differential values being a difference between a value of one pixel in the first plurality of pixels and an average of values of two pixels in the second plurality of pixels, the two pixels in the second plurality of pixels being adjacent to the one pixel in the first plurality of pixels.

* * * * *

UNITED STATES PATENT AND TRADEMARK OFFICE
CERTIFICATE OF CORRECTION

| | | |
|---|---|---|
| PATENT NO. | : 8,593,572 B2 | Page 1 of 1 |
| APPLICATION NO. | : 12/247915 | |
| DATED | : November 26, 2013 | |
| INVENTOR(S) | : Nix et al. | |

It is certified that error appears in the above-identified patent and that said Letters Patent is hereby corrected as shown below:

In the Specification:

Column 5, Line 46, delete "motion detector 305" and insert -- motion detector 205 --.

Column 9, Line 30, delete "more that one" and insert -- more than one --.

Signed and Sealed this
Fourth Day of March, 2014

Michelle K. Lee
*Deputy Director of the United States Patent and Trademark Office*